Nov. 4, 1958     F. FAHLAND     2,858,905

ADJUSTABLE WHEEL BLOCK

Filed June 29, 1956     2 Sheets-Sheet 1

*INVENTOR.*
FRANK FAHLAND
BY
*Francis T. Burgess*
ATTORNEY

Nov. 4, 1958  F. FAHLAND  2,858,905
ADJUSTABLE WHEEL BLOCK
Filed June 29, 1956  2 Sheets-Sheet 2
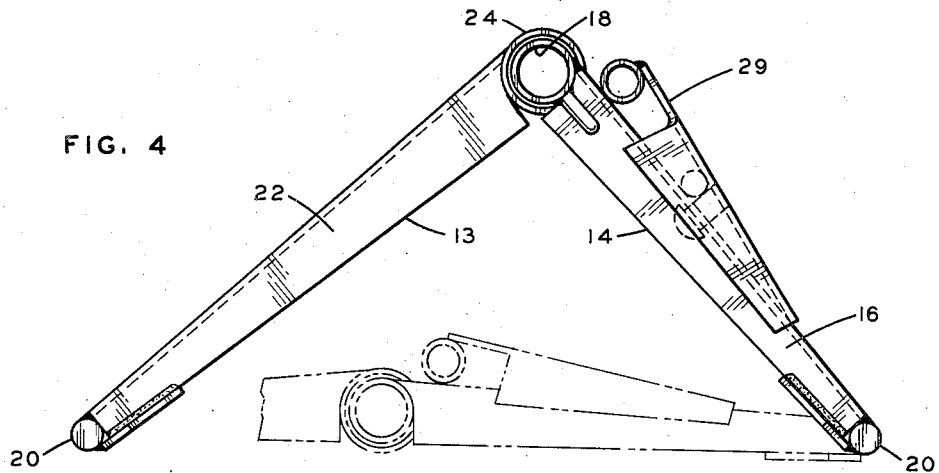
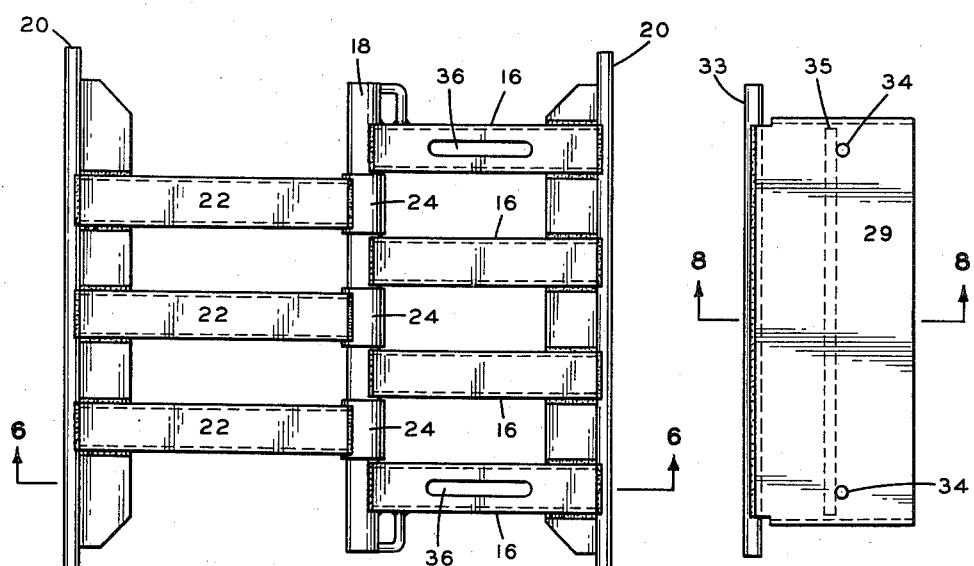
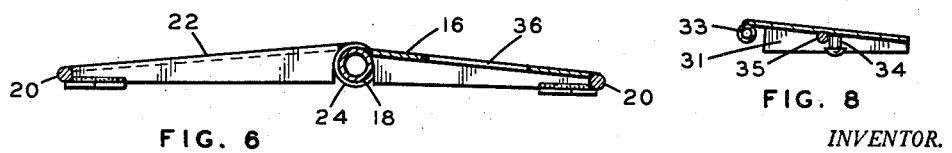
INVENTOR.
FRANK FAHLAND
BY
Francis T. Burgess
ATTORNEY ର
United States Patent Office 2,858,905
Patented Nov. 4, 1958

2,858,905

ADJUSTABLE WHEEL BLOCK

Frank Fahland, Omaha, Nebr.

Application June 29, 1956, Serial No. 594,842

1 Claim. (Cl. 188—32)

The invention relates to vehicle wheel blocks and consists particularly of a self-adjusting collapsible wheel block for use on vehicle carrying railway cars.

The handling of heavy highway trailers on railway flat cars necessitates the use of positive means for preventing any movement of the trailer on the car during transit, including the combination of trailer-supporting pedestals, jacks, tie-downs, and wheel blocks. In my copending application, Serial No. 462,808, filed October 18, 1954, now Patent No. 2,837,038, a flat car deck is provided with a plurality of longitudinally extending and transversely spaced slotted rails which serve the dual purpose of guiding the highway trailer wheels along the deck of the car and of fixing the location of the wheel blocks and pedestals lengthwise of the car. To facilitate movement of the trailers and tractors lengthwise of the car, both the pedestals and wheel blocks are collapsible; this feature permits the trailers and tractors to pass over these structures without requiring their removal from the car deck. It has been found, in operation of trailer carrying systems such as that disclosed in my above-mentioned application, that regardless of how tightly the wheel blocks are initially placed against the wheels, some slack occurs between wheels and blocks after the train begins to move.

Accordingly it is a principal object of this invention to provide a wheel block for mounting on a flat car with means for automatically tightening its engagement with the wheels of vehicles supported on the car responsive to movements of the vehicle carrying car.

It is a further object to provide the above feature in combination with the collapsible features of the wheel block disclosed in my co-pending application.

These objects and other detailed objects as will be apparent from the following description are attained by the structure illustrated in the accompanying drawings, in which:

Figure 4 is a side view of the wheel block.

Figure 5 is a top view of the wheel block with the adjustment wedge removed.

Figure 6 is a sectional view of the wheel block along the line 6—6 of Figure 5.

Figure 7 is a top view of the adjustment wedge.

Figure 8 is a sectional view of the wedge taken along the line 8—8 of Figure 7.

Figure 1:
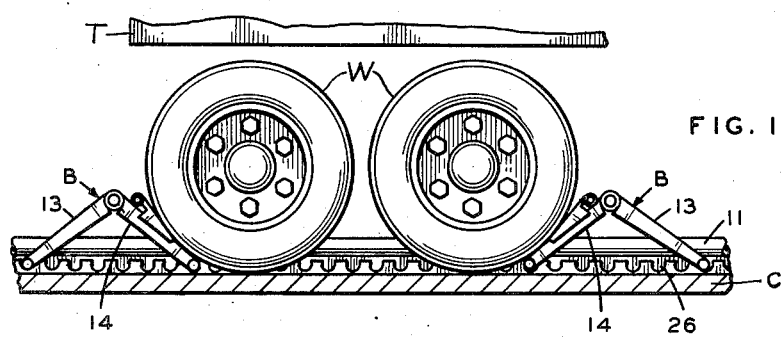
Figure 1 is a side view of the wheels of a highway trailer and the wheel blocks as initially positioned prior to movement of the trailer-carrying car.

The car floor C is provided with a plurality of transversely spaced longitudinally extending slotted rails 11, as disclosed in my co-pending application referred to above, one pair of these rails being located on each side of the car deck and being spaced apart transversely a slightly greater distance than the width of the tire treads on conventional trailer dual wheels. The wheel blocks B each consists of a pair of brace members 13 and a wheel-engaging member 14 hingedly connected to each other for movement from a flat position on the deck of the car to a raised operative position. The wheel engaging member 14 consists essentially of a plurality of inverted channels 16 welded at one end to a tube 18 and at the other end to an elongated rod 20. The member 13 consists similarly of a plurality of spaced inverted channels 22 alternately disposed with relation to the arrangement of channels 16. Channels 22 are secured by welding at their lower ends to a rod 20 and at their upper ends to short tubular members 24 which are journaled about member 18 in the spaces between adjacent channel members 16. For retaining the structure in any desired position the extended ends of rods 20 are adapted to fit in the slots 26 in slotted rails 11. The adjustable feature of this arrangement is provided by a wedge which consists of a plate 29 flanged at its sides as at 31 and secured at its upper end to a tubular member 33. Tubular member 33 and the lower edge of plate 29 rest on the upper surfaces of the channels with flanges 31 of plate 29 in engagement with the outer flanges of the outer channels 16 and is secured to these outer channels by means of pins 34 which pass through longitudinal slots 36 in the webs of the outer channels. An additional bearing is provided for plate 29 on the surfaces of channels 16 by rod 35, which is secured to the underside of plate 29 intermediate its upper and lower ends.

Figure 2:
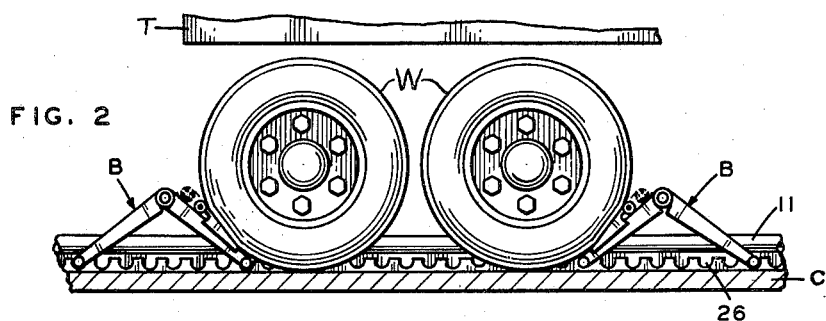
Figure 2 is a side elevation corresponding to Figure 1, but showing the wheel blocks at their automatically-adjusted position.
Figure 3:
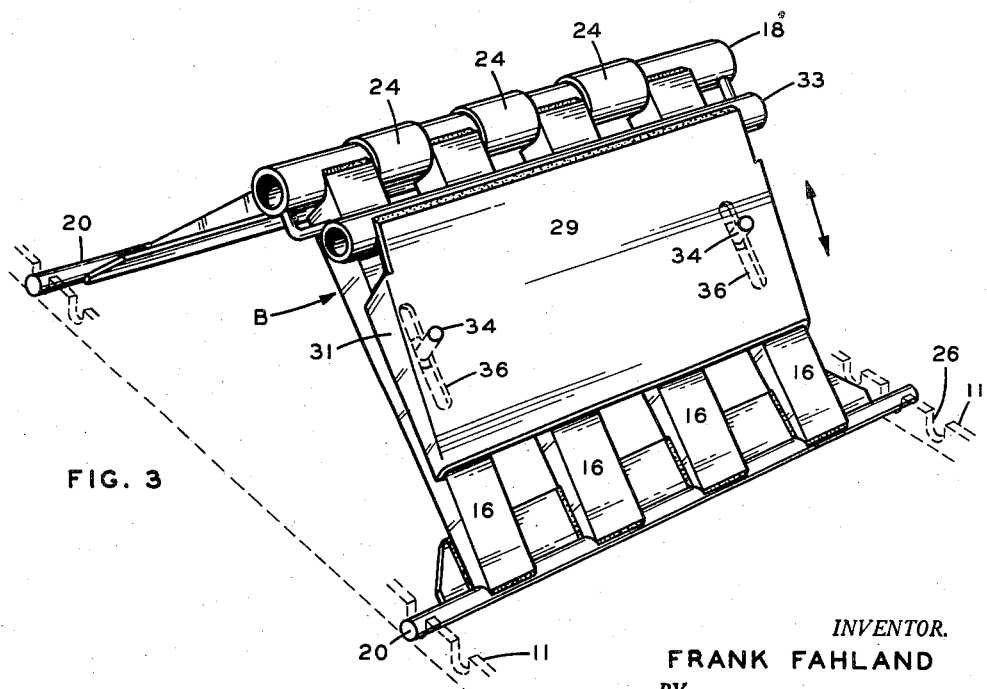
Figure 3 is a perspective view of the wheel block.

Operation of the device can best be seen by reference to Figures 1 and 2. It will be understood that during loading of the trailers T on the flat cars, the blocks will be flat, in their fully extended positions, on the car floor C. When the trailer wheels W reach the desired location on the car, the blocks are manually moved upwardly to the position shown in Figure 1 with the wedge and the intermediate portion of the upper surfaces of channels 16 in the tightest possible engagement with the tire treads. When the train is started, the trailer will tend to roll backward on the car, leaving a space between the tread of the forward tires and the wheel block, thus permitting the wedge 28 on the forward wheel block to slide downwardly on the surface of channels 16 to the position shown in Figure 2, thus taking up much of the slack between the tires and wheel blocks. Upon braking or during any abrupt backward movement of the train, the tendency of the trailer to move forward on the car deck permits the wedge of the rear wheel block to slide downwardly, thus taking up any additional slack between wheel blocks and tires which may have remained after the forward wedge slid to its lowermost position. The resultant relationship of wheel blocks, wedges, and wheels is seen in Figure 2.

The details of the structure may be varied substantially without departing from the spirit of the invention and the exclusive use of those modifications coming within the scope of the appended claim is contemplated.

I claim:

In combination with a vehicle supporting surface having upwardly slotted rails, a wheel block including a substantially flat wheel-engaging surface portion normally inclined about an axis extending transversely of said rails, a brace portion hingedly connected to said wheel-engaging surface portion of an axis extending transversely of said rails, said surface portion and said brace portion including structure selectively engageable with said slotted rails at different positions longitudinally thereof for positioning said wheel block on said vehicle supporting surface and adjusting the inclination of said surface portion from raised operative positions to a horizontal inoperative position, and a gravity-actuated wheel-engaging wedge secured to said surface portion for movement thereon in the direction of inclination whereby to automatically take up slack between said surface portion and said wheel.

References Cited in the file of this patent

UNITED STATES PATENTS

| | | |
|---|---|---|
| 704,358 | McCullough | July 8, 1902 |
| 864,680 | Neville et al. | Aug. 27, 1907 |
| 1,229,714 | Clark et al. | June 12, 1917 |
| 1,446,055 | Miller | Feb. 20, 1923 |
| 2,581,619 | Arrigo | Jan. 8, 1952 |
| 2,818,940 | Boyle | Jan. 7, 1958 |

FOREIGN PATENTS

| | | |
|---|---|---|
| 675,784 | France | Nov. 8, 1929 |
| 46,791 | France | June 6, 1936 |

UNITED STATES PATENT OFFICE
CERTIFICATE OF CORRECTION

Patent No. 2,858,905                                                    November 4, 1958

Frank Fahland

It is hereby certified that error appears in the printed specification of the above numbered patent requiring correction and that the said Letters Patent should read as corrected below.

Column 2, line 65, for "portion of" read -- portion on --.

Signed and sealed this 3rd day of February 1959.

(SEAL)
Attest:

KARL H. AXLINE                                              ROBERT C. WATSON
Attesting Officer                                         Commissioner of Patents